United States Patent
Porte et al.

(10) Patent No.: US 6,954,298 B2
(45) Date of Patent: Oct. 11, 2005

(54) ELECTRO-OPTIC MODULATOR, THE PRODUCTION METHOD THEREFOR AND THE BLOCK FOR IMPLEMENTING SAME

(75) Inventors: Henri Porte, Serre les Sapins (FR); Jérôme Hauden, Besançon (FR); Pascal Mollier, Besançon (FR); Alain Carenco, Bourg-la-Reine (FR)

(73) Assignee: Photline Technologies, Serre les Sapins (FR)

( * ) Notice: Subject to any disclaimer, the term of this patent is extended or adjusted under 35 U.S.C. 154(b) by 82 days.

(21) Appl. No.: 10/491,669
(22) PCT Filed: Oct. 3, 2002
(86) PCT No.: PCT/FR02/03381
§ 371 (c)(1),
(2), (4) Date: Apr. 5, 2004
(87) PCT Pub. No.: WO03/029881
PCT Pub. Date: Apr. 10, 2003

(65) Prior Publication Data
US 2004/0240036 A1 Dec. 2, 2004

(30) Foreign Application Priority Data
Oct. 3, 2001 (FR) .............................. 01 12727

(51) Int. Cl.$^7$ ............................. G02F 1/03; G02F 1/01; G02B 6/00
(52) U.S. Cl. ....................... 359/245; 359/254; 359/238; 385/140
(58) Field of Search ................................ 359/245, 254, 359/240, 239, 238, 247, 250; 385/140, 24, 32, 34

(56) References Cited
U.S. PATENT DOCUMENTS
5,886,807 A 3/1999 Cummings .................. 359/263

FOREIGN PATENT DOCUMENTS
EP 0 452 938 10/1991
GB 2 328 756 3/1999

OTHER PUBLICATIONS

Armenise M N et al: "Traveling–Wave Electrooptical Modulator in Inhomogeneous Lithium Niobate" Alta Frequenza, Ufficio Centrale AEI–CEI. Milano, IT., vol. 52, No. 3, May 1, 1983 (May 1, 1983), pp. 212–214, XP002039230, figure 1.

Primary Examiner—Timothy Thompson
(74) Attorney, Agent, or Firm—Young & Thompson

(57) ABSTRACT

An electric-optic modulator includes a block of crystal having electro-optic properties, the block extending lengthways along a long axis and having a light guide which extends between a light guide input and a light guide output. An electric modulation signal acts on an interaction zone of the block via coplanar electrodes together with the light guide via a dielectric layer. The electrodes are disposed on a main long face of the block and the interaction zone is elongated more or less along the long axis. The light to be modulated arrives through an input optical fiber which is connected to the light guide at the light guide input on a first face of the block. The modulated light leaves the modulator through an output optical fiber connected to the light guide output on a second face of the block. The first face and the second face are one single face (D) which is parallel to the long axis.

13 Claims, 3 Drawing Sheets

ELECTRO-OPTIC MODULATOR, THE PRODUCTION METHOD THEREFOR AND THE BLOCK FOR IMPLEMENTING SAME

This invention relates to the field of electro-optic modulators and in particular to the lithium niobate-based integrated modulators and comprising an optical structure of Mach-Zehnder interferometer type, a directional coupler or other. The invention suggested may however be applied to-modulators provided in other materials such as lithium tantalum, semi-conductive materials III–V (Gallium arsenide, indium phosphide as well as the polymers thereof.

The main application of the fast optical modulators based on lithium niobate relates mainly to the field of digital telecommunications via long distance and broadband optical fibre. This type of modulator known comprises an optical chip whereof the typical dimensions are of the order of 5 cm in the long direction, 2 mm in the width direction and 0.5 mm in the height direction. The optical chip is generally inserted in a metal case whereof the properties of thermal expansion are taken into account with respect to those of the chip and to those of the input and output optical fibres.

The optical chip based on lithium niobate electro-optical crystals comprises on its surface an optical circuit enabling to guide the light according an interferometer configuration of Mach-Zehnder type, of directional coupler type, or, more generally, any other structure enabling modulation of an optical signal by an electric signal. In the case of a Mach-Zehnder interferometer configuration which is taken as an example in this application, the optical circuit or light guide comprises two Y-shaped branches connected by two rectilinear arms. The light guide may be provided by thermal diffusion of a metal such as titanium or also by substitution between lithium ions and protons of an acid source, a method called proton exchange.

On the surface of the guide, a layer of a dielectric material is deposited as a small thickness, about 1 $\mu$m. On this dielectric layer, for example made of silica, a structure of electrodes, so-called with progressive waves, is provided. These electrodes may in particular be provided according to coplanar wave guide architecture, with a central conductor and two lateral mass planes. These electrodes enable to route an electric modulation signal which interacts with the light propagating in the arms of the interferometer. The differential optical phase-shift between the arms which is modulated by the electro-optical effect translates by modulated luminous interferences and produces a light signal whereof the intensity varies according to the modulation. The modulator therefore acts as an interface between the electric signal and the light signal. For efficient operation, the coplanar line must have small losses, be suited in impedance to avoid spurious reflections and, moreover, the speed of the microwave in the line must be equal to the speed of the light wave in the optical guide (isochronism condition) to guarantee optimum operation on a wide frequency band.

Implementation difficulties are still observed in these conventional devices which also exhibit limitations. Indeed, to reduce the value of the control voltage to a few volts only, the width of the central conductor must be smaller than ten micrometers and the spacing of the mass planes should not exceed three times the width of the line to meet the phase and impedance adaptation condition and maintain high electric field inside the guide with a small potential difference. Moreover, the modulators require a continuous control voltage in order to control the operating point of the device. This is done generally by withdrawing a portion of the energy from the output fibre by the intermediary of a fibre coupler. The signal thus withdrawn is detected by an external photodiode linked with an electronic slaving circuit connected either to a set of low frequency electrodes, or to the microwave electrodes through the intermediary of a component called 'polarisation T'. This makes the assembly, consequently, heavier.

The optical chip as it is known, is also characterised in that the input and the output of the optical circuit make use of a rectilinear guide section beginning and terminated on the opposite faces of the device. Conversely, the input and the output of the microwave line make use of either or each of the sides perpendicular to the optical input/output faces.

The input/output optical fibres are conventionally glued to the crystal by dint of a polished ferrule. The optical fibres may be soldered on orifices of the case in order to guarantee the tightness of the case. This operation may consist in removing the sheath from the optical fibre, metalising said fibre and soldering said fibre in its bare portion.

This configuration generally adopted exhibits a number of shortcomings, on the one hand on the mechanical plane and associated with encapsulation, on the other hand on the plane of microwave frequency handling. These shortcomings are in particular as follows:

the fact of baring the optical fibre over a short section makes it mechanically brittle to handle. Not to twist excessively the fibre when inserting the optical chip into the case, one should use a case of great length authorising large bending radii to the optical fibres. The resulting shortcoming is the large space requirement, incompatible with miniaturisation. One may however solve this problem by providing open case passageways on one edge for the chip fitted with both its fibres, the passageways being then closed by parts whereon the soldering is provided, which implies additional mechanical parts which should also be welded to the case assembly, hence increased complexity and costs.

the fact that the fibres are on opposite faces along the greater length makes the problem of differential thermal expansion critical between the fibres, the crystal and the metal case, the traction resulting therefrom may cause separation of the ferrules.

another shortcoming resulting from gluing the fibres on the opposite faces is linked with the fact that in such a case, it is necessary to polish both faces, which makes the production stages heavier.

the fact that the input and the output of the microwave signal are perpendicular to the direction of propagation of the signals in the interaction region requires great bending of the electrodes. Both bends introduce in a first stage propagation losses. They also cause an aerial effect with possible coupling on the substrate modes notably because of the anisotropy thereof, implying attenuation of the high frequency signal and the occurrence of unwanted absorption streaks. To correct this, the bend must be studied specifically and the substrate modes eliminated for instance by narrowing the crystal.

This invention aims at suggesting a solution to these different shortcomings by providing a modulator of particular structure and enabling to implement a new method of assembly of the optical fibres on the optical chip. The invention is based on an original approach of the encapsulation of the modulators, with a view to improving their performances notably in particular during very high frequency operation. In this view, it is suggested that the optical circuit integrates the bends introduced conventionally in the design of the microwave lines provided on the fast optical modulator.

The invention relates to an electro-optic modulator comprising a block of crystal having electro-optic properties, the block extending lengthways along a long axis and comprising a light guide which extends between a light guide input and a light guide output,
an electric modulation signal acting on an interaction zone of the block by means of coplanar electrodes together with the light guide through the intermediary of a dielectric layer, the electrodes being disposed on a main long face of the block and the interaction zone being substantially elongated along the long axis,
the light to be modulated arriving through an input optical fibre connected to the light guide at the light guide input on a first face of the block,
the modulated light leaving the modulator through an output optical fibre connected to the light guide at the light guide output on a second face of the block.

According to the invention, the first face and the second face are one single face which is parallel to the long axis, the light guide comprising two bends respectively between the light guide input and a first end of the interaction zone and between a second end of the interaction zone and the light guide output.

In other words, the light guide input and the light guide output lie on the same face of the block which is parallel to the long axis of the block. On the other hand, the terms input and output are indicative since bidirectional devices are contemplated.

In various embodiments of the invention, the following means which can be combined according to all the technically possible combinations are used:
- both bends are substantially symmetrical relative to one another,
- the modulator is in a case,
- the optical input and output fibres are terminated at the case by connectors,
- the optical input and output fibres run through the case by passageways and are fixed for instance by soldering on the case,
- the optical fibres are connected to the block through the intermediary of ferrules polished with a connection angle between the ferrule and the block intended to suppress spurious reflections in the coupling zone,
- the optical guide comprises a Mach-Zehnder interferometer,
- the block exhibits the following approximate dimensions: 5 cm along the long axis on 2 mm in width and 0.5 mm in height,
- the crystal is lithium niobate,
- the crystal is of lithium tantalum,
- the crystal is based on semi-conductors III–V (gallium arsenide, indium phosphide),
- the crystal is based on polymers,
- the light guide is the result of a thermal diffusion of a metal,
- the metal is titanium,
- the light guide is the result of a proton exchange by substitution of lithium ions and protons of an acid,
- the dielectric layer is silica,
- the dielectric layer has a thickness of approximately 1 $\mu$m,
- the electrodes are terminated by two ends of remote electrodes, the electrode ends terminate along opposite edges on the main face,
- the electrodes are terminated by two ends of remote electrodes, the electrode ends terminate along the same edge on the main face,
- each of the electrode ends is linked with a connector on the case,
- one of the electrode ends is intended to be linked with a modulation electric signal generator through the intermediary of an connector on the case and the other end of electrodes is linked with an adaptation charge,
- an amplification electronic module is provided in the case between a connector and one of the electrode ends,
- an electronic module of modulation and amplification is provided in the case between a connector and one of the electrode ends,
- the modulator comprises moreover means for adjusting its electrical operating point,
- one of means for adjusting of the operating point consist of at least one additional electrode provided on one section of the Mach-Zehnder interferometer and provided outside the interaction zone with coplanar electrodes,
- one of means for adjusting of the operating point is a counter-reaction circuit comprising a photodiode intended to capture a complementary light field transmitted by the interferometer in the block,
- the photodiode is provided on a lateral face of the block perpendicular to the long axis of said block,
- a means for adjusting the operating point is a counter-reaction circuit comprising an electronic circuit,
- the modulator comprises moreover means for adjusting its electrical operating point comprising a photodiode intended to capture a complementary light field transmitted by the interferometer in the block, an electronic circuit and a set of counter-reaction electrodes provided on one section of the Mach-Zehnder interferometer and provided outside the interaction zone with coplanar electrodes,
- a means for adjusting the operating point is a counter-reaction circuit comprising a photodiode intended to capture a complementary light field transmitted by the interferometer in the block, an electronic circuit and a set of counter-reaction electrodes provided on one section of the Mach-Zehnder interferometer and provided outside the interaction zone with coplanar electrodes.

The invention also relates to a production method of an electro-optic modulator comprising a block of crystal having electro-optic properties, the block extending lengthways along a long axis and comprising a light guide which extends between a light guide input and a light guide output, an electric modulation signal acting on an interaction zone of the block by means of coplanar electrodes together with the light guide through the intermediary of a dielectric layer, the electrodes being disposed on a main long face of the block and the interaction zone being substantially elongated along the long axis, the light to be modulated arriving through an input optical fibre connected to the light guide at the light guide input on a first face of the block, the modulated light leaving the modulator through an output optical fibre connected to the light guide at the light guide output on a second face of the block wherein is implemented for the first face and the second face one single face which is parallel to the long axis and two bends are provided in the light guide respectively between the light guide input and a first end of the interaction zone and between a second end of the interaction zone and the light guide output, both bends being substantially symmetrical relative to one another.

The method of the invention may be combined to all the possible actions to meet the structural characteristics listed previously such as, for instance, the provision of one or several additional electrodes to offer one of the means for adjusting the operating point.

The invention finally relates to a block as implemented in the modulator according to one or several previous characteristics.

The invention enables a reduction in size of the case in the direction of length, the simplification of the passageway of the optical fibres in the openings of the case in a single operation without any excessive twist of the fibre. The fibres being glued on a single side of the crystal, it is necessary to polish only a single face of the substrate. The fibres coming out of a single side of the case, the thermal expansion effects are exerted on one single side, avoiding the tractions on the micro-blocs glued to opposite faces, case it is the case in the previous art.

The preferred mode of propagation of the light being the extraordinary mode, more confined as the ordinary mode, the loss differences by bends have a polarising effect while attenuating the ordinary component, which is interesting according to the application contemplated.

The bends being reported on the optical guides, the micro-wave lines or electrodes may be designed without any bends, which improves significantly the performances at high frequency, on the one hand in terms of electric losses, on the other hand as regards radiation coupling on the substrate modes. In the case of straight lines, the electromagnetic field remains confined between the line and the mass plane throughout the propagation.

It is thus possible to eliminate the losses introduced by the bends of the electrodes in the propagating electric signal and to eliminate the couplings by an aerial effect on the substrate modes of the crystal of lithium niobate.

It is possible to integrate control electronics in the front face of the block of crystal and an output-adapted charge, without disturbing the optical signal and without discontinuities in the propagation of the microwave electric signal. It is also possible to integrate a photodiode on the rear face of the block to guarantee a detection of the complementary light field transmitted by the interferometer and a counter-reaction enabling to control the operating point of the modulator, this in a compact fashion and without withdrawing any light from the output optical fibre. It is also possible within the framework of the invention to provide a set of parallel electrodes for the application of a direct voltage intended for adjusting the operating point of the modulator.

The interest of the invention from the viewpoint of encapsulation, lies in that the input and output faces must be subjected to particularly accurate polishing to provide a sharp edge with an angle of 90° without any notches. According to the previous art, this operation must be carried out once for each face. In the invention suggested, the same face acting as an input face and as an input face for the light, a single polishing operation is necessary, simplifying the technological production stages.

This invention brings therefore a solution in the field of encapsulation notably for running the optical fibres and for reduction of the longitudinal size of the cases. The invention enables indeed to shorten significantly the length of the case, and hence the space requirements of the device. Indeed according to the previous art, the contributions to the global length of the device are due to the length of the optical chip properly speaking, increased by the length of two micro-blocks maintaining the fibres in input output, of the lengths of fibre necessary to reach the opening in the case, and finally of the rigid and flexible mechanical protection elements of the fibre, provided outside the case. The assembly may represent a total length ranging between 12 and 15 cm. In the invention suggested, the different contributions are supported by one of the sides of the case. The lateral space requirement is therefore increased with respect rapport to the previous art, but the longitudinal space requirement is reduced to the minimum corresponding to the length of the optical chip properly speaking.

This invention is now exemplified by the following description without being limited thereto and in relation with the following Figures:

FIG. 1 of the state of the art, represents a modulator in a case,

Figure 7:
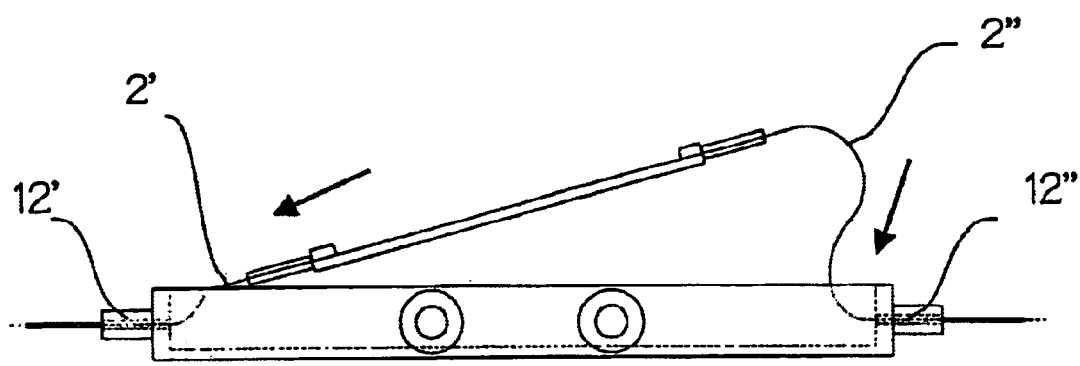
Figure 8:
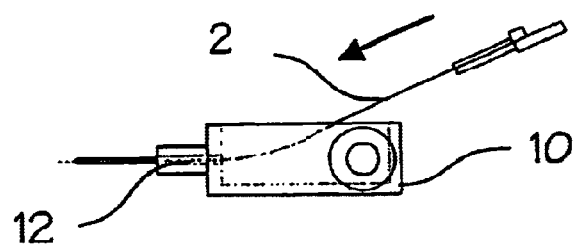

FIG. 7 of the state of the art, represents an encasing step,

FIG. 8 represents the same step for a modulator according to the invention.

Figure 1:
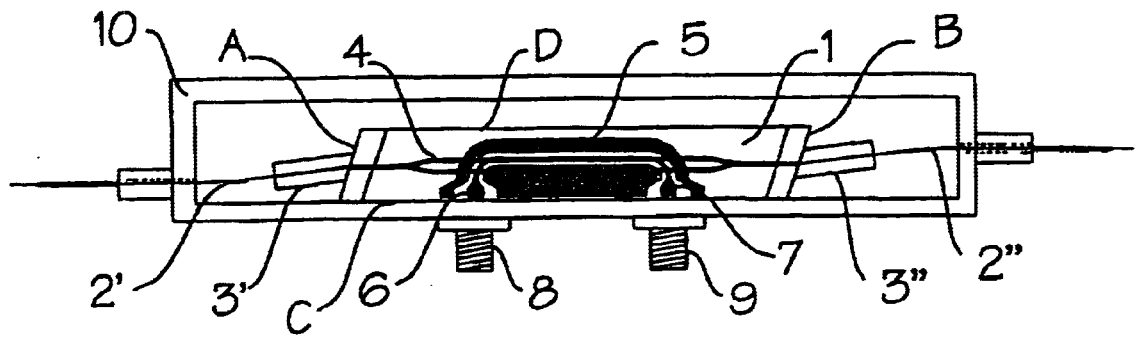

FIG. 1 represents the current state of the art in the field of the integrated optical modulators on lithium niobate. In this basic version, the optical chip receives two optical input/output fibres 2' and 2" mounted on the ferrules polished 3' and 3" respectively with an angle to clear away from spurious reflections and aligned with a light guide 4 diffused at the surface of the block 1 of crystal. It should be noted here that it is necessary to polish both opposite faces of the block. The light guide is provided according to a Mach-Zehnder type interferometer architecture. The input of the light guide is performed along the edge or face A of the block and the output by the edge or face B. Coplanar electrodes 5 are aligned parallel to the pattern of the guide. The input 6 and the output 7 of the electrodes, situated on the edge or face C of the crystal, are aligned perpendicular to the main direction of propagation of the waveguide and connected to the electro-optical interaction zone by dint of a bend performing a rotation by an angle of 90°. A connector 8 mounted on the case enables to supply a modulation electrical signal on the input of the electrodes. A second connector 9 is connected on the output of the electrodes 5 and enables to connect a load adapted to the characteristic impedance of the line. The fibres are bared behind the micro-block and soldered on the part letting through the fibre to the outside of the case 10.

In such a configuration the optical chip of lithium niobate, for instance cut preferably along the direction Z of the crystal, comprises an active portion of Mach-Zehnder interferometer, consisting of two sections of parallel rectilinear guides forming the arms of the interferometer. A Y-junction is linked with each of these arms, at input to divide and separate in two the incident light wave, and in output to recombine both waves phase-shifted by electro-optic effect by the electric signal, thus enabling the modulation of the light. In a modulator corresponding to the previous art, these Y-shaped junctions, as represented on FIG. 1, are connected to the sections of rectilinear guide optical, terminated on each opposite face of the crystal along a sharp edge which enables insertion of the light by a first side and the extraction of the light by the opposite side. As will be seen on FIG. 7, such a configuration imposes great constraints on the fibre by bend when running through at least one of the openings during the encasing operation.

The optical guides forming the integrated optical circuit are generally provided by depositing a metal tape, for instance made of titanium, of given thickness, for instance 70 nm and of fixed width, for instance to 7 µm. An index gradient is obtained from this metal layer by high temperature thermal diffusion for some ten hours. The optical guide obtained supports a single mode at the working wavelength. In a small confinement, it enables by a compromise an efficient coupling between the light field of the optical fibre and the light field guided by the index gradient diffused.

Figure 2:
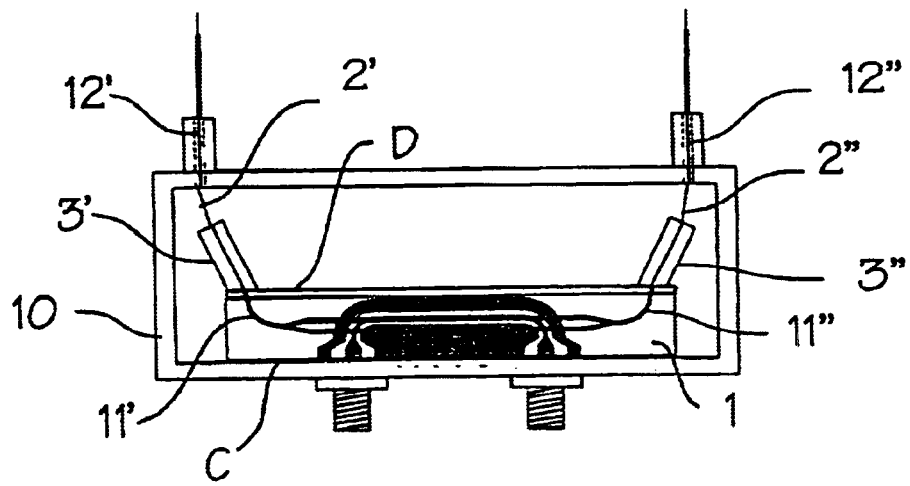
FIG. 2 represents a first embodiment of the invention.

FIG. 2 correspond to the first version of the invention and represents the optical chip in the form of a block 1 of a material having electro-optic properties inserted in its case 10. In this configuration, the input and the output of the light guide are on the same face D of the block 1. This is obtained by forming a bend 11' and 11" at each end of the optical circuit in the block, both bends being preferably symmetrical relative to one another as represented. It should be noted here, that one single face D of the block must be polished which simplifies the production operations. The micro-blocks 3' and 3" enclosing the optical fibres are attached and glued on one single face D and consequently both fibres come out of the same side. This first approach enables insertion of the fibres by the input/output 12' and 12" passageways, drilled in the case, in a single operation without any excessive twist of the fibres. In case of variation in temperature, the traction which may be exerted on the fibres because of the expansion of the materials follows a single direction. According to FIG. 2, the micro-wave lines comprise a bend at input output. The major advantage of this approach consists in reducing considerably the dimensions and the space requirement of the case in the direction of the length or long axis of the block.

It should be noted that the ferrules supporting the fibres are tilted. This corresponds to the necessity of introducing a small angle when inserting the light of the fibre towards the guide and of the guide towards the fibre. This angle is generally used to avoid reflections on the interfaces between dioptres of different refraction indices, detrimental to the quality of the radiation and to that of the modulation. The relations of Snell-Descartes are used to choose the angle of incidence of the optical guide with respect to that of the optical fibre. Taking into account the index of the crystal of lithium niobate of the order of 2.14 at the wavelength of 1550 nm employed in modern fibre communication systems, and the silica index of the optical fibre of the order of 1.46, if one considers an angle of 10° between the direction of the guide and the output plane of the crystal, the fibre must be polished with an angle of 14.6°. This 10° emergence angle limits the rotation of the bend to 80°. The losses in the bends being proportional to the angle travelled, the emergence angle contributes for a few percent to the reduction of the optical losses.

According to this invention, as represented on FIG. 2, the Y-shaped junctions are connected to a section of optical guide of curved shape, drawing an arc of circle, which enables the light to travel an angle ranging for instance between 80° and 90°, and this with a bending radius of the order of 5 mm, typically. The orientation of the bends is such that it is possible to connect these curved guides to a section of rectilinear guide of short length enabling to connect each end of the optical circuit towards a single lateral face of the crystal. In such a configuration, the light coming out of an optical fibre maintained in a ferrule will enter through a face of the crystal to come out of the other end of the optical circuit towards the output fibre connected by a ferrule to the same face of the crystal. One of the interests of this approach lies in the simplification of the passageway of the fibres in the openings of the case, as will be seen with FIG. 8. This solution thus enables to break free from the constraints exerted on the fibre and on the ferrules glued to the optical chip supporting the fibre.

The optical losses by propagation in the bends, may be reduced significantly by increasing the confinement of the light, in a localised fashion. It suffices to do so to increase in the curved regions, the thickness of the titanium tape, for instance 100 nm, and its width, for instance 8 µm. This corresponds to a quasi multimode operation for a straight guide which reduces quite considerably the losses when a bend is introduced. This technological process may be called "double deposit".

It should be noted that the diffusion profile of the extraordinary index used to produce a small control voltage modulator, is notably different of that of the ordinary index. In particular, the ordinary index profile obtained after thermal diffusion of titanium is vastly less confined than that of the extraordinary index. Consequently, the optical propagation losses in the bends, even for a "double deposit" structure for the ordinary mode are significantly higher than those of the extraordinary mode. The introduction of a bend has therefore partially polarising effect on the incident radiation, which may prove interesting in multiple applications.

Figure 3:
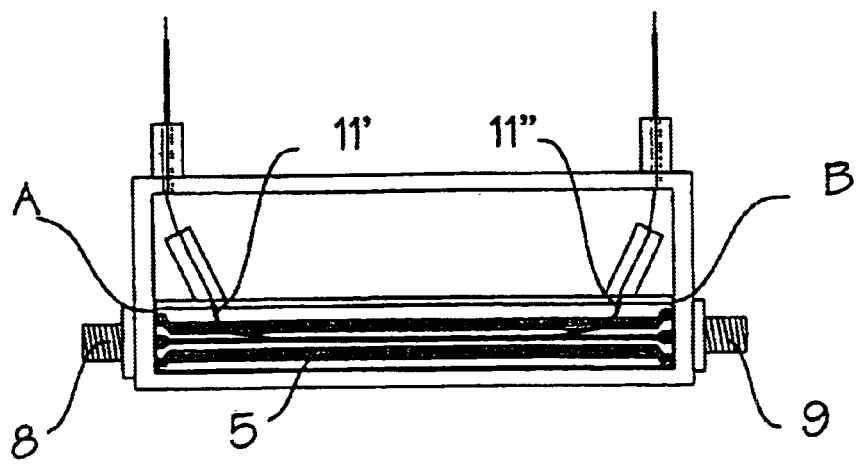
FIG. 3 represents a second embodiment of the invention.

FIG. 3 is an alternative wherein, with respect to the device of FIG. 2, the microwave lines deposited on the surface of the optical circuit do not comprise any bends and are connected in A and B to the electronic input/output 8 and 9 connectors inserted on two opposite sides of the case. The optical circuits comprise bends 11' and 11". The major advantage of this bend-less configuration in the electric lines consists, on the one hand, in limiting the losses, authorising operation at very high frequency and, on the other hand, to limit the couplings on the substrate modes, which enables to obtain a response without any high frequency resonances.

As regards the advantage of the microwave modulation of a transfer of bends between the electric lines and the optical guides, this must be considered with a view to using the device at very high frequencies (>20 GHz). Indeed, for these frequencies, one observes the presence of high resonances in the transmission curve of the microwave signal. These resonances are caused by an aerial effect coupling in the bends on the own propagation modes of the microwave wave guide formed by a parallelepiped substrate of lithium niobate of very high dielectric permittivity, forming consequently a rectangular wave guide. These resonances are vastly reduced when the lines do not comprise any bends but solely a rectilinear section. In the case when the light is inserted through curved optical guides by one of the sides of the substrate, it is possible to provide lines in the direction of the length. In such a case, the microwave connectors are provided at each end of the case, as represented on FIG. 3. Consequently, there is no interruption in the propagation of the microwave.

A variation consists in providing a microwave line output load in a coplanar fashion on an alumina substrate and welded to the end of said line which enables to dispense with the output electric connector.

Figure 4:
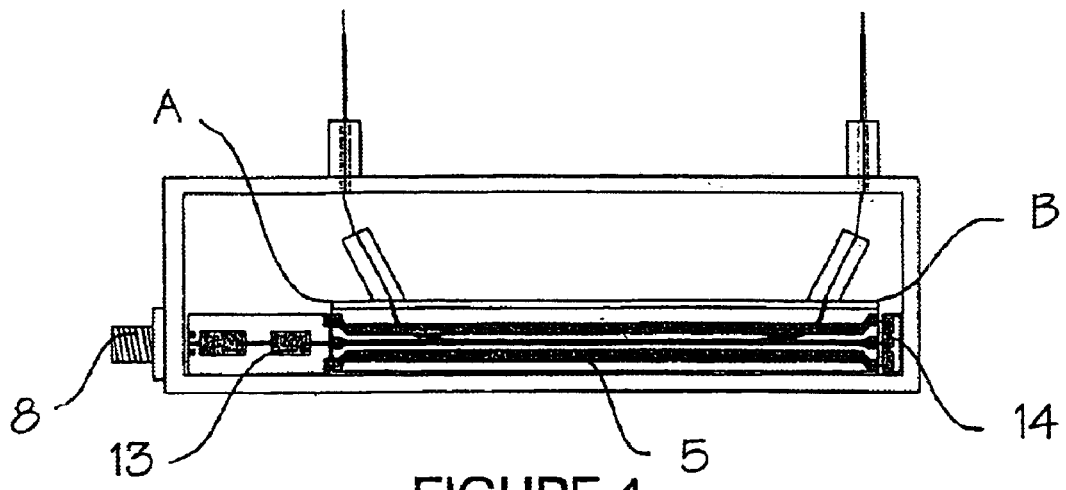
FIG. 4 represents a third embodiment of the invention.

FIG. 4 is an improved version of that of FIG. 3 wherein the case comprises amplification electronics 13 in the form of one or several semi-conductor chips inserted between the input electronic connector 8 and the beginning of the microwave line of the optical chip by the face or edge A of the block. Moreover, at output, an adapted load 14 is linked with the other end of the line by the face or edge B of the block. This approach enables to process and to amplify a microwave signal and this, before optical interaction without impedance interruption and without any detrimental effects caused by the bends, which improves the response to very high frequencies. In such a configuration, the electrical signal propagates without running through curved sections from the connector to the adapted load, thereby improving the global electric response.

Biasing or adjusting the operating point of such structures may be provided by design, while integrating a 90° optical phase-shifter between the arms, for instance by ablation of the surface of the guide corresponding to one of the arms, or also by using a polarisation T. To increase the integration of the device, it is possible to take out directly the light at output of the block with a photodiode placed in the path of the complementary light transmitted outside the optical guide by the interferometer.

Figure 5:
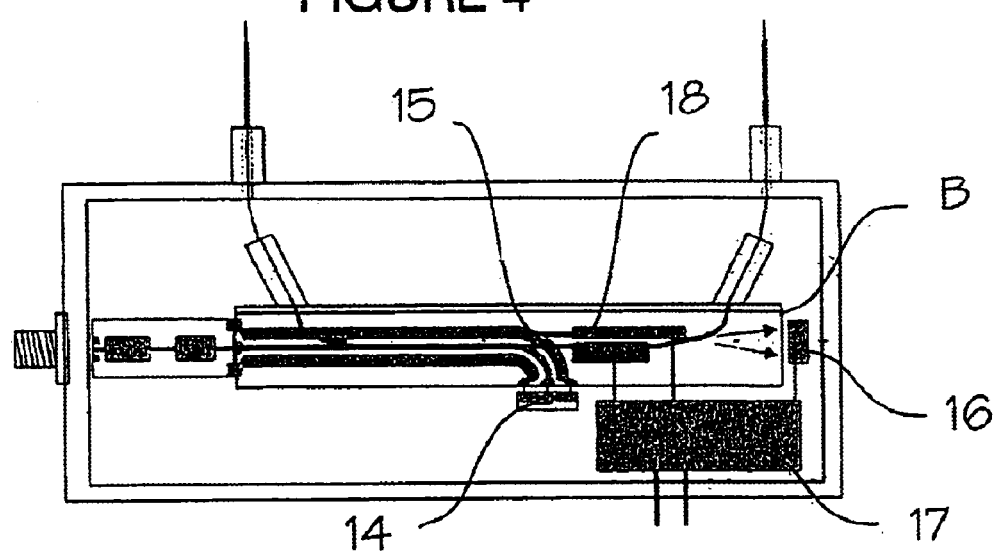
FIG. 5 represents a fourth embodiment of the invention.

According to a variation represented on FIG. 5, it is possible to placer a photodiode on the rear face of the substrate of in order to control the operating point of the device by an electronic counter-reaction circuit. In such a case, the end of the microwave line shows a bend towards an adapted load, after interaction with the optical wave. The photodiode is placed on the path of the complementary light transmitted by the interferometer. This light comes out of the coupling of the light after re-combination of the waves after propagation through the arms. When the waves are in phase, they are coupled on the symmetrical fundamental mode of the optical guide which is transmitted by the fibre. When the waves are in phase opposition, they are coupled on the anti-symmetrical mode which is not guided and which is therefore a leak mode. This light which propagates along a straight line may be processed when it is detected through the output face of the substrate as a free beam. It should be noted that such a photodiode may be a fast photodiode intended to perform a counter-reaction on the amplitude of hyperfrequency modulation, in order to optimise the error rate in a standard digital transmission.

On FIG. 5, the microwave line terminates by a bend 15 after the interaction region or zone with the optical wave. This end is linked with an adapted load 14 placed on a side. The end B of the block or substrate which is then freed is used to place a photodiode 16 intended to capture the complementary light field transmitted by the interferometer in the substrate. The photodiode is designed for slaving by a counter-reaction electronic circuit 17 of the operating point of the modulator by dint of low frequency electrodes 18. This enables to obtain very integrated version of the device.

Figure 6:
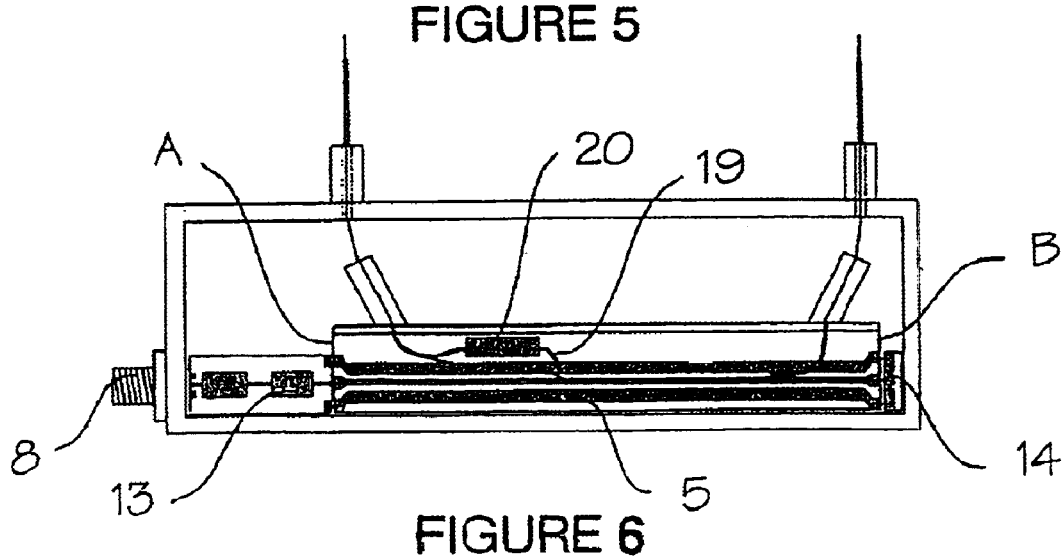
FIG. 6 represents a fifth embodiment of the invention.

FIG. 6 is still another version wherein the possibility of providing bends in the optical wave guides to induce offset in the structure of Mach-Zehnder, is used, so that a section of the Mach-Zehnder lies the structure of coplanar electrodes 5 thanks to the bends 19, which enables to apply a continuous adjustment voltage of the operating point of the modulator via an additional electrode 20.

It should be understood that these few examples of embodiment are purely indicative including, within the framework of the invention, all the possible combinations of shapes of electrodes with straight and/or curved ends, the presence of amplification and/or counter-reaction electronics or not, with various types of additional electrodes.

FIG. 7 represents the way of inserting the optical fibres 2' and 2" in the passageways 12' and 12" of the case according to the previous art. The bends introduced are liable to cause rupture of the fibre, notably if the latter is deprived of its sheath.

FIG. 8 represents the insertion procedure of both optical fibres 2 in the passageways 12 of the case according to the invention suggested. This technique enables to minimise the bends of the optical fibres and the constraints exerted.

What is claimed is:

1. An electro-optic modulator comprising a block (1) of crystal having electro-optic properties, the block extending lengthways along a long axis and comprising a light guide (4) which extends between a light guide input and a light guide output, an electric modulation signal acting on an interaction zone of the block by means of coplanar electrodes (5) together with the light guide through the intermediary of a dielectric layer, the electrodes being disposed on a main long face of the block and the interaction zone being substantially elongated along the long axis, the light to be modulated arriving through an input optical fibre (2') connected to the light guide at the light guide input on a first face of the block, the modulated light leaving the modulator through an output optical fibre (2") connected to the light guide at the light guide output on a second face of the block, characterised in that the first face and the second face are one single face (D) which is parallel to the long axis, the light guide comprising two bends (11', 11") respectively between the light guide input and a first end of the interaction zone and between a second end of the interaction zone and the light guide output.

2. A modulator according to claim 1 characterised in that the optical fibres are connected to the block through the intermediary of ferrules (3', 3") polished with a connection angle between the ferrule and the block intended to suppress spurious reflections in the coupling zone.

3. A modulator according to claim 1 characterised in that the electrodes are terminated by two ends of remote electrodes, the electrode ends terminated along opposite edges (A, B) on the main face.

4. A modulator according to claim 1 characterised in that the electrodes are terminated by two ends of remote electrodes, the electrode ends terminated along the same edge (C) on the main face.

5. A modulator according to claim 1 characterised in that the optical guide comprises a Mach-Zehnder interferometer and the crystal is lithium niobate.

6. A modulator according to claim 1 characterised in that the block is in a case, each of the electrode ends is linked with a connector on the case.

7. A modulator according to claim 6 characterised in that an amplification electronic module is provided in the case between a connector and one of the electrode ends.

8. A modulator according to claim 6 characterised in that the modulator comprises moreover means for adjusting its electrical operating point comprising a photodiode intended to capture a complementary light field transmitted by the interferometer in the block, an electronic circuit and a set of counter-reaction electrodes provided on a section of the Mach-Zehnder interferometer and provided outside the interaction zone with coplanar electrodes.

9. A production method of an electro-optic modulator comprising a block (1) of crystal having electro-optic properties, the block extending lengthways along a long axis and comprising a light guide (4) which extends between a light guide input and a light guide output, an electric modulation signal acting on an interaction zone of the block by means of coplanar electrodes (5) together with the light guide through the intermediary of a dielectric layer, the electrodes being disposed on a main long face of the block and the interaction zone being substantially elongated along the long axis, the light to be modulated arriving through an input optical fibre connected to the light guide at the light guide input on a first face of the block, the modulated light leaving the modulator through an output optical fibre connected to the light guide at the light guide output on a second face of the block characterised in that one single face (D) is implemented for the first face and the second face, which is parallel to the long axis and two bends are provided in the light guide respectively between the light guide input and a first end of the interaction zone and between a second end of the interaction zone and the light guide output, both bends being substantially symmetrical relative to one another.

10. A block (1) of crystal having electro-optic properties intended to be implemented in an electro-optic modulator, the block extending lengthways along a long axis and comprising a light guide (4) which extends between a light guide input and a light guide output, the block comprising coplanar electrodes (5) together with the light guide through the intermediary of a dielectric layer and intended to receive an electric modulation signal, the electrodes being disposed on a main long face of the block and comprising an interaction zone substantially elongated along the long axis, the light to be modulated arriving through an input optical fibre (2') connected to the light guide at the light guide input on a first face of the block, the modulated light leaving the modulator through an output optical fibre (2") connected to the light guide at the light guide output on a second face of the block, characterised in that the first face and the second face are one single face (D) which is parallel to the long axis, the light guide comprising two bends (11', 11") respectively between the light guide input and a first end of the interaction zone and between a second end of the interaction zone and the light guide output, both bends being substantially symmetrical relative to one another.

11. A modulator according to claim 2 characterised in that the electrodes are terminated by two ends of remote electrodes, the electrode ends terminated along opposite edges (A, B) on the main face.

12. A modulator according to claim 2 characterised in that the electrodes are terminated by two ends of remote electrodes, the electrode ends terminated along the same edge (C) on the main face.

13. A modulator according to claim 7 characterised in that the modulator comprises moreover means for adjusting its electrical operating point comprising a photodiode intended to capture a complementary light field transmitted by the interferometer in the block, an electronic circuit and a set of counter-reaction electrodes provided on a section of the Mach-Zehnder interferometer and provided outside the interaction zone with coplanar electrodes.

* * * * *